March 29, 1955   R. M. CARRIER, JR., ET AL   2,705,070
BALANCED CONVEYOR
Filed March 17, 1950   4 Sheets-Sheet 1
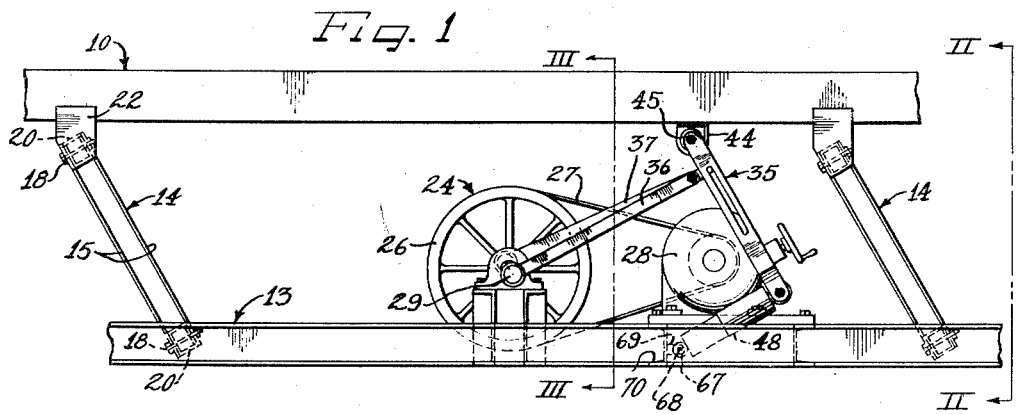
Fig. 1
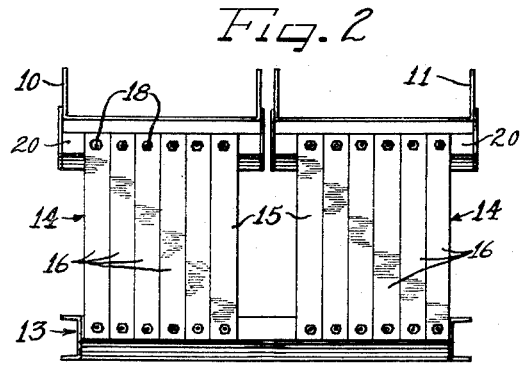
Fig. 2
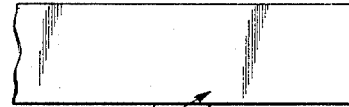
Fig. 4
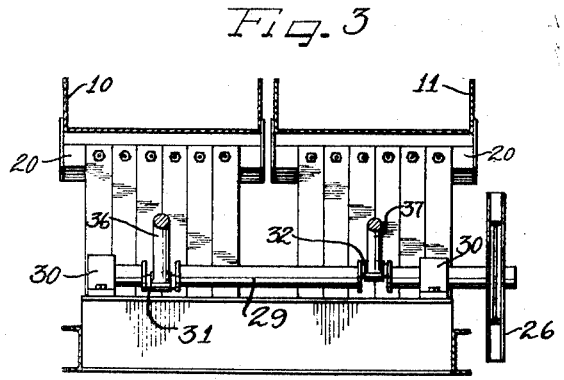
Fig. 3
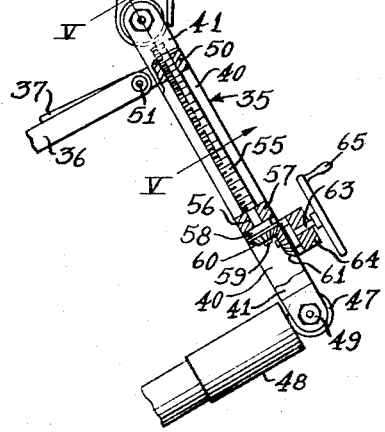
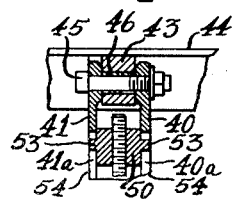
Fig. 5
Inventors
Robert M. Carrier Jr.
Maurice G Whitley
by The Firm of Charles W Hills
Attys March 29, 1955   R. M. CARRIER, JR., ET AL   2,705,070
BALANCED CONVEYOR
Filed March 17, 1950   4 Sheets-Sheet 2
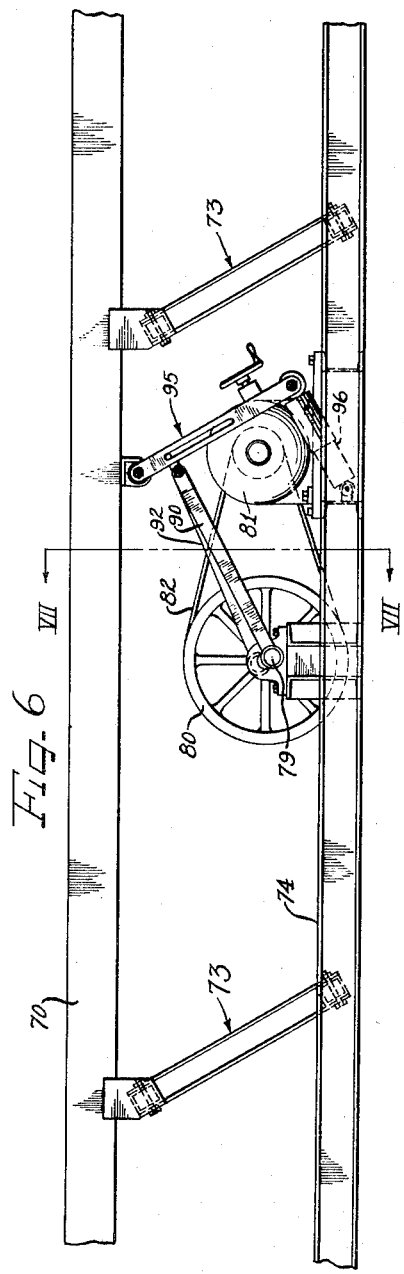
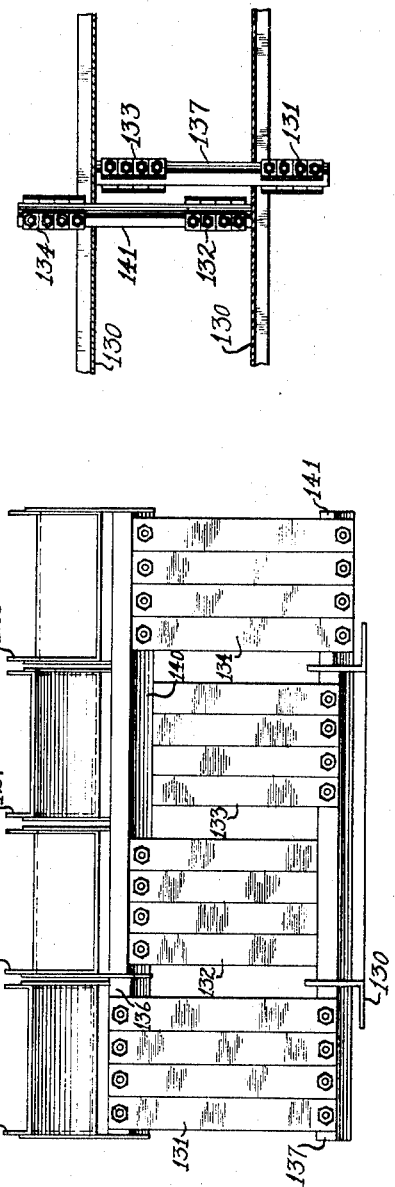
Inventors
Robert M. Carrier Jr.
Maurice G. Whitley
by The Firm of Charles Hill   Attys March 29, 1955 R. M. CARRIER, JR., ET AL 2,705,070
BALANCED CONVEYOR
Filed March 17, 1950 4 Sheets-Sheet 3

Inventors
Robert M. Carrier Jr.
Maurice G. Whitley
by The Firm of Charles Hill Attys

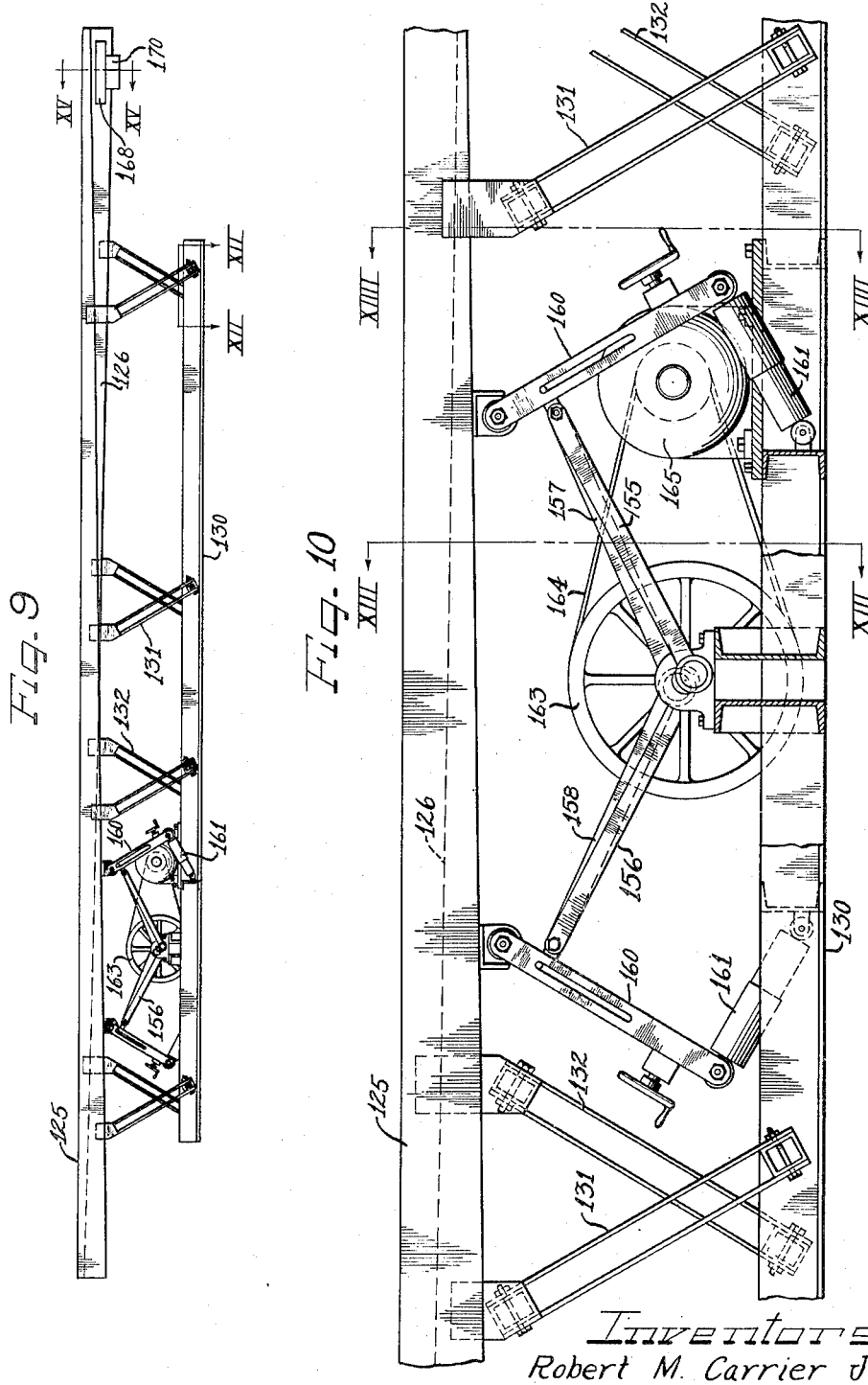

United States Patent Office 2,705,070
Patented Mar. 29, 1955

2,705,070

BALANCED CONVEYOR

Robert M. Carrier, Jr., and Maurice G. Whitley, Louisville, Ky., assignors, by mesne assignments, to Carrier Conveyor Corporation, Louisville, Ky., a corporation of Kentucky Application March 17, 1950, Serial No. 150,326

3 Claims. (Cl. 198—220)

The present invention relates to improved conveyor apparatus. More particularly, it has to do with conveyors which move material along by the directional throw principle and are provided with counterbalancing members which are reciprocated with a movement directly opposite the movement of the conveyor pan or trough so that the conveyor will operate with substantially vibration-free characteristics.

This is a continuation-in-part of our copending applications, U. S. Serial No. 11,998, filed February 28, 1948, and now Patent No. 2,630,210, and U. S. Serial No. 136,794 and now Patent No. 2,630,211, filed January 4, 1950.

Conveyors which are designed for operation at a single station, as for example, a floor-mounted or a ceiling-mounted conveyor, have heretofore required a rigid support member and means for securing said conveyor to the support to prevent creeping or moving of the conveyor relative to the support during conveying of the material. For such an installation the ceiling or the floor support must be of specially designed heavy duty construction.

It is therefore an object of the present invention to provide a conveyor and a mounting therefor which permits substantially vibration-free operation of the conveyor, thus eliminating the necessity for special rigid support mountings.

Another object of this invention is to provide a conveyor which conveys material according to the directional throw principle and is provided with a counterbalancing member movable at all times in a direction opposite to the directional movement of the conveyor trough to eliminate shaking and vibrating of the conveyor during operation.

Another object of this invention is to provide a conveyor wherein the counterbalancing is effected through two or more conveyor troughs which operate in such a manner and direction as to eliminate vibrations in the system.

A still further object of this invention is to provide a novel conveyor of the trough type which has provisions for balancing out the vibrations due to operating and has mechanism for actuating the conveyor at the natural frequency of the spring mounting on which the conveyors are supported.

Another and still further object of this invention is to provide a balanced conveyor of the trough type having power means for actuating the conveyor at the natural frequency of the spring mounting and means for positively maintaining the frequency of the spring mounting.

Other and further objects, features and advantages of the present invention will be apparent to one skilled in the art from the following detailed description taken in connection with the accompanying drawings.

On the drawings:

Figure 1 is a fragmentary side elevational view of a trough conveyor constructed in accordance with the teachings of the present invention;

Figure 2 is an end elevational view taken on line II—II of Figure 1;

Figure 3 is a vertical sectional view taken on line III—III of Figure 1;

Figure 4 is a fragmentary enlarged side elevational view of a portion of the mechanism of Figure 1 with parts broken away to more clearly disclose the apparatus;

Figure 5 is a fragmentary sectional view taken on line V—V of Figure 4;

Figure 6 is a fragmentary side elevational view of a second embodiment of the conveyor of the present invention;

Figure 9 is a side elevational view of a fourth embodiment of the conveyor of the present invention;

Figure 10 is an enlarged fgragmentary side elevational view of the conveyor of Figure 9 with parts broken away to more clearly disclose the mechanism;

Figure 11 is an end elevational view of the conveyor of Figure 9;

Figure 12 is a fragmentary horizontal sectional view taken on line XII—XII of Figure 9;

As shown on the drawings:

Figure 8:
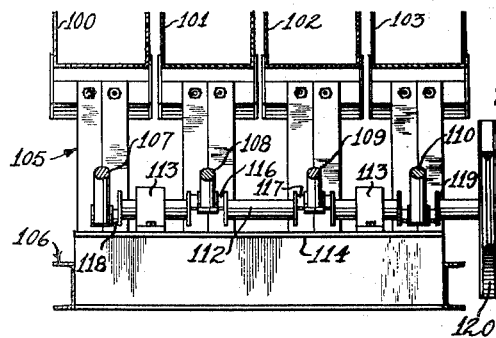
Figure 8 is a vertical sectional view taken on the same plane as Figure 7 but showing a third embodiment of the conveyor of the present invention. A side elevational view of the embodiment of Figure 8 will be identical to Figure 6.

In Figures 1 to 4, inclusive, the reference numerals 10 and 11 indicate two material support members such as conveyor pans of the trough type supported from a rigid base 13 on parallelogram type spring mountings 14.

The base 13 may suitably be made of a plurality of channel members disposed longitudinally of the conveyor trough and rigidly secured in spaced relation by means of cross channel braces.

The parallelogram spring mountings 14 each include spaced parallel spring assemblies 15. Each spring assembly 15 includes a plurality of separate spring members 16 secured at their ends by means of bolts 18 to a laterally extending square tube 20. As seen in Figure 1, the tube 20 extending between the lower end of the spring assemblies may be secured, as by welding, between the side walls of the channel members of the base 13, while the tube 20 at the upper end is secured, as by welding, between upright plate members 22 which are in turn secured to the side walls of each conveyor trough. Thus the lower tube 20 extends from one side of the base 13 to the other while the upper tube 20 extends only between the side walls of the associated conveyor pan.

Each spring assembly 15 could, of course, be made of a single flat spring of a width to extend entirely across the conveyor. The use of a multiplicity of spring members 16 lends itself more readily to variations in the conveyor size.

As seen above, each spring mounting is a parallelogram with the parallel spring assemblies 15 forming one pair of opposite sides and the transverse tubes 20 forming the other parallel sides.

In operation, the tubes at the upper end will move with the flexing upper end of the spring members 16. In this movement however the angle between the tube 20 and the conveyor will not change. Thus, no twisting movement will be delivered to the conveyor trough as in conveyors furnished heretofore. The tubes 20 are subjected to a twisting action but they are relatively short and very strong and can withstand this stress. With this spring mounting the conveyor trough itself can be of a relatively light construction.

Each of the conveyor troughs 10 and 11 is arranged to deliver material to the right, as seen in Figure 1, due to the fact that the spring mountings 14 are inclined upwardly to the left. As the conveyor is reciprocated by means of a drive mechanism 24 the material will be moved along the conveyor pan surfaces according to the directional throw principle.

The drive mechanism 24 includes a pulley wheel 26 driven by a belt 27 from an electric motor 28. The pulley wheel 26 is keyed to a crankshaft 29 (Figure 3) which is journalled at its ends in pillow blocks 30 and has spaced crank throws 31 and 32 which are 180° out of phase.

The separate conveyor pans 10 and 11 are each separately connected to the crankshaft 29 through identical motion transmitting linkages 35 and through a connecting rod 36 associated with the pan 10 and a connecting rod 37 associated with the pan 11.

Each motion transmitting linkage assembly 35 (Figures 4 and 5) comprises spaced elongated arm members 40 and 41 which are pivotally connected at their upper ends on opposite sides of a flange 43 extending longitudinally from a transverse angle support member 44, by means of a bolt 45. The angle support 44 may be secured, as by welding, across the lower surface of the conveyor trough. The bolts 45 extend through a rubber bushing 46 disposed in an opening in the flange 43. Thus, the upper end of the arms 40 and 41 are resiliently and pivotally mounted on the conveyor trough.

At their lower ends (Figure 4) the spaced arms 40 and 41 are disposed on opposite sides of an eye 47 secured to the end of a shock absorber 48 by means of a bolt 49. The bolt 49 passes through a rubber bushing (not shown) which extends through the eye 47 of the shock absorber.

The connecting rod 36 is pivotally connected by means of a pin 51 to a block 50 which is slidably disposed between the spaced arms 40 and 41 having lateral extensions 53 (Figure 5) disposed in longitudinal slots 54 in each arm. The block 50 is moved up and down between the arms 40 and 41 by means of a feed screw 55 which is threaded through the block and has, at one end, a reduced cylindrical portion 56 journalled for rotation in a guide block 57 which is welded between the arms 40 and 41. An enlarged end 58 is formed on the feed screw 55 on the opposite side of the block 57 and carries an axial extension 59 on which a bevel gear 60 is keyed. The bevel gear 60 is in mesh with a bevel gear 61 keyed to a rod 63 which is journalled in a strap 64 extending across the arms 40 and 41 and arranged to be rotated by means of a hand wheel 65. It will be evident of course that rotation of the hand wheel 65 moves the block 50 up and down between the arms 40 and 41 as the block 50 is guided by means of the lateral extensions 53 in the slots 54 of the arm.

It will be understood of course that the connecting rod 37 which is associated with the conveyor pan 11 is connected to the pan through a motion transmitting mechanism identical to the mechanism 35 above described.

It is further to be noted that the spaced arms 40 and 41 may be replaced by a solid link that has no associated adjustment screw in installations where adjustment of the speed of conveying is not desired.

The shock absorber 48 is preferably of standard construction and, as disclosed in Fig. 4, is a direct acting telescopic type shock absorber having relatively linearly adjustable movable elements, at least one of the elements of the shock absorber being movable in an inelastic hydraulic fluid medium. As is more particularly described in our acknowledged co-pending application Serial No. 11,998, filed February 28, 1948, the shock absorber 48 includes a member movable through an inelastic fluid such as a conventional hydraulic liquid medium and the movable member has a restricted opening therethrough so that linear adjusting movement occurs between the elements of the shock absorber in response to variations in continuous load applied to the shock absorber as, for example, when an increased load is placed upon the conveyor member. A periodically applied load is normally transmitted by the shock absorber without relative displacement of its elements since the shock absorber acts substantially like a rigid link because of the inelasticity of the hydraulic medium and the slow acting characteristics of the shock absorber structure. As mentioned above, one end of the shock absorber is pivotally mounted between the arms 40 and 41. The other end of the shock absorber has an eye extension 67 (Figure 1) which is pivotally connected by means of a pin 68 to an arm 69 projecting from a lateral channel support member 70.

In operation, when the motor 28 is energized the connecting rods 36 and 37 will drive their respective conveyor troughs 10 and 11. Since the connecting rods are connected to crank throws that are 180° out of phase, the conveyor pans will be reciprocated in exactly opposite directions at any one time. Since the conveyor pans are of the same size and weight and are supported on identical spring mechanisms and driven through identical motion transmitting linkages, it is evident that the forces set up by the movement of the conveyor pans will always be equal and opposite and will balance out each other. Thus the trough conveyor illustrated in Figures 1 to 5, inclusive, features two side by side conveyor pans each delivering material in the same direction and each acting to balance the other during conveying of material.

Figure 7:
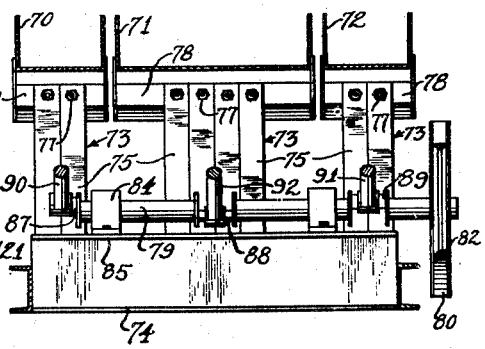
Figure 7 is a vertical sectional view taken on line VII—VII of Figure 6.

In Figures 6 and 7 there is illustrated a second embodiment of the novel balance conveyor of the present invention. This embodiment features three conveyor pans 70, 71 and 72. These pans are mounted on parallelogram type spring assemblies 73 from a support base 74. The support base 74 may be of standard channel construction while the spring assemblies 73 are identical in operation and mounting to the spring assemblies 14 disclosed in connection with the conveyor of Figures 1, 2 and 3. It is to be noted however that the spring assemblies associated with the outer pans 70 and 72 have half as many spring elements 75 as the center assembly which is associated with the pan 71. This is of course because the center pan is equal in weight to the combined weight of the two outer pans. At their lower ends the spring assemblies 73 are bolted to a laterally extending tubular member, similar to the lower members 20 of Figure 1 and, at their upper ends, they are secured by bolts 77 to individual lateral tubes 78 extending between the sides of the pan. The separate conveyor troughs 70, 71 and 72 are each driven from a crankshaft 79 which is keyed to a pulley wheel 80 which, in turn, is driven from an electric motor 81 through a pulley 82. The crankshaft 79 is journalled in pillow blocks 84 which are secured to a transverse support channel 85.

The crankshaft 79 has three cranks 87, 88 and 89. The cranks 87 and 89 which receive connecting rods 90 and 91, respectively, are in phase while the crank throw 88, on which a connecting rod 92 is pivotally disposed, is 180° out of phase with the other two crank throws. As will be clearly seen in Figure 7 the connecting rods 90, 91 and 92 are associated respectively with the conveyor troughs 70, 71 and 72.

Each connecting rod is connected to the associated conveyor trough through a motion transmitting linkage 95 (Figure 6), which is identical in construction and operation to the motion transmitting mechanism 35 of Figure 4. Similarly, a shock absorber 96, identical to the shock absorber 48, is associated with each motion transmitting linkage 95.

Thus, in the embodiment illustrated in Figures 6 and 7, there is a conveyor system having three conveyor pans side by side each arranged to convey material in the same direction, the center pan being equal in weight to the combined weight of both the outside pans, and powered from the same shaft 180° out of phase with the outer pans. It will, of course, be recognized that the movement of the center pan 71 is directly opposite to the movement of the outer pans 70 and 72. Therefore, this movement tends to balance out the force set up by the movements of the other two conveyor pans.

In Figure 8 is shown a third embodiment of the conveyor of this invention. This embodiment provides four conveyor pans 100, 101, 102, and 103. Each pan is supported on a parallelogram type spring mounting 105, the operation of which has been described hereinabove, from a rigid support base 106 of any rigid construction. Connecting rods 107 and 108, 109 and 110 are associated respectively with the conveyor pans 100, 101, 102 and 103. These connecting rods are connected to their respective conveyor troughs through motion transmitting mechanism and shock absorbers which are not illustrated but which are identical in construction to the members 95 and 96 illustrated in Figure 6.

A crankshaft 112 is journalled in a pillow box 113 which is rigidly secured to a transverse support base 114. This crankshaft 112 has two center cranks 116 and 117 which are in phase and two outer cranks 118 and 119 which are in phase with each other but are 180° out of phase with the center cranks 116 and 117.

The spring mountings 105 are all inclined in the same direction and therefore the conveyor pans will all deliver material in the same direction.

The crankshaft 112 is keyed to a pulley 120 which is driven from an electric motor, such as the motor in Figure 6, through a belt 121.

In operation, the outer pans 100 and 103 will move in one direction while the center pans 101 and 102 move in an opposite direction. Since all of the pans in the associated and drive mechanisms are of an equal weight and are identically supported on the support structure, it is apparent that the vibrations set up by the movement of the center conveying pans will balance out the vibrations set up by the outer conveying pans.

In Figures 9 to 15, inclusive, there is illustrated a novel conveyor arrangement constructed according to the teachings of the present invention and particularly arranged for use as a drying conveyor. In such a conveyor the material is subjected to air and room temperature or to a heated gas which may be directed through a closed top conveyor trough. In Figures 9 to 15, the conveyor is illustrated as having an open top. However, it will be appreciated, that closure plates could be installed across the top to define closed chambers for heated gas.

Referring to Figure 11 it will be seen that there is provided in this embodiment four conveyor pans 125, 126, 127 and 128 which are supported from a rigid base 130 by means of parallelogram type spring mountings 131, 132, 133 and 134. At their upper ends, the spring assemblies 131 and 133 are connected to a common transverse support tube 136 by suitable bolts. The tube 136 is connected between the outer side plates of the conveyor pans 125 and 127. At their lower ends, the spring assemblies 131 and 133 are suitably connected to a transverse support tube 137 which is welded to upright flanges of the support base 130. Thus, the conveyor troughs 125 and 127 are mounted on spring assemblies which are inclined in the same direction and secured to common transverse support members so that the pans 125 and 127 convey material in the same direction.

The spring assemblies 132 and 134 are connected at their upper ends to a transverse tube 140 which extends between outer side plates of the conveyor pans 126 and 128. At their lower ends the spring assemblies 132 and 134 are connected to a common transverse tube 141 which is welded to the upright flanges of the support base 130. Thus the conveyor pans 126 and 128 are mounted on springs which are inclined in the same direction and supported from common transverse tubes and therefore they are arranged to deliver material in the same direction.

Figure 13:
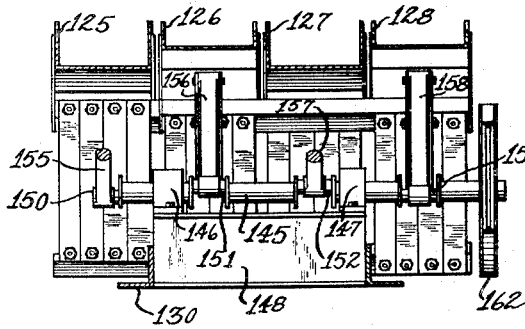
Figure 13 is a vertical sectional view taken on line XIII—XIII of Figure 10.

Referring to Figure 13 it will be seen that there is provided in this embodiment a crankshaft 145 which is journalled in pillow blocks 146 and 147 which are mounted on a transverse support base 148 which extends between side flanges of the support base 130. The crankshaft 145 has four spaced crank throws 150, 151, 152 and 153. The crank throws 150 and 153 are in phase with each other but 180° out of phase with the crank throws 151 and 152.

Figure 14:
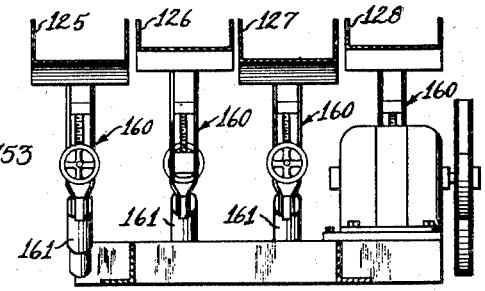
Figure 14 is a vertical sectional view taken on line XIV—XIV of Figure 10.
Figure 15:
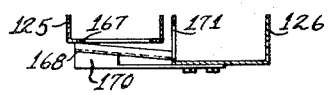
Figure 15 is a vertical sectional view taken on line XV—XV of Figure 9.

Connecting rods 155, 156, 157 and 158 are disposed on the various throws of the crankshaft as shown in Figure 13 and are associated respectively with the conveyor pans 125, 126, 127 and 128. Similarly, as shown in Figure 14, a motion transmitting mechanism 160, identical to the motion transmitting mechanism 35 of Figure 1, and a shock absorber 161, identical to the shock absorber 48 of Figure 1, are associated with each conveyor trough or pan for transmitting the movement of the crankshaft and the various connecting rods.

The crankshaft 145 is driven by means of a pulley wheel 163 through a belt 164 from an electric motor 165.

Referring to Figure 9 it will be seen that the conveyor pan 125 has a bottom wall that is slanted upwardly to the right so that the discharge end of the pan is several inches above the charging end. Similarly the conveyor pan 126 slants upwardly to the left. It will be understood, although not illustrated, that the conveyor pan 127 slants upwardly to the right and the conveyor pan 128 slants upwardly to the left. At the right hand end, as seen in Figure 9, of the conveyor 125 there is an opening 167 (Figure 15) in the pan. Similar openings are in the upper, discharge end of each pan.

The opening 167 overlies a trough 168 which has upstanding side walls and a slanted bottom wall. The trough 168 is arranged to be supported by a bracket 170 from the bottom of the trough or conveyor pan 126. The trough 168 is arranged to deliver material to an opening 171 in the side wall of the conveyor pan 126. Thus material being delivered upwardly along the conveyor pan 125 will fall through the opening 167 onto the trough 168 and will be delivered to the conveyor pan 126. It will be understood that the opening 167 has considerable less longitudinal extent than the trough 168 since the conveyor pans are moving in opposite directions during conveying of the material. Similar troughs are disposed at the charging end of the pans 127 and 128.

Referring to Figure 11 it will be seen that the pans 125 and 127 are inclined upwardly in the same direction and are mounted on springs inclined in the same direction therefore they deliver material in the same direction whereas the conveyor pans 126 and 128 are inclined in the opposite direction and are mounted on springs inclined in the opposite direction and therefore they are arranged to deliver material in the opposite direction. Thus material deposited on conveyor pan 125 at the low left hand end, as seen in Figure 9, will be discharged at the right hand end into conveyor pan 126 and subsequently will be discharged to the conveyor pan 127 at the left hand end and similarly into conveyor pan 128 and will finally be discharged at the left hand end, as seen in Figure 1, of the conveyor pan 128. As previously mentioned this type of conveyor is particularly useful as a drying conveyor wherein the material is moved along while being subjected to air at room temperature or heated air.

Thus, in the embodiments illustrated in Figures 9 to 15, inclusive, there is disclosed a conveyor assembly having four equal weight conveyor pans mounted side by side but conveying in alternate directions and driven from a common shaft by four separate eccentrics. The pans are connected to the crankshaft so that the movement of the pans are as follows: the two center pans are in phase and the two outer pans are 180° out of phase with the two inside pans and so are in phase with each other.

From the foregoing description it will be seen that there is provided in this invention several novel conveyor arrangements each of which is aranged to operate so that the vibrations set up by the moving parts are substantially eliminated.

It will be understood of course that the conveyors of this invention are arranged for operation at the natural frequency of the spring mountings according to the principle of operation disclosed in our copending application of which this is a continuation-in-part, and especially in application, U. S. Serial No. 11,998.

It will be understood that modifications and variations may be effected without departing from the scope of the novel concepts of the present invention.

We claim as our invention:

1. In combination, a base member, a vibratory member and drive means for vibrating the same with respect to said base member, and a series of spring assemblies extending between said base member and said vibratory member to resiliently support the latter for vibration by said drive means, each of said spring assemblies comprising at least two parallel, laterally deflectable leaf springs fixedly secured at their ends in laterally spaced apart relation to said members respectively a distance several times the thickness thereof and sufficient to eliminate relative twisting strains at the connections of said vibratory member and spring assemblies upon vibration of the former, and a support member on said vibratory member to which one end of said leaf springs are fixedly secured in such spaced apart relation whereby said support member forms one side of a non-articulated parallelogram of which the adjacent sides are said springs and is free of twisting strain relative to said vibratory member.

2. The combination of claim 1 wherein said support members include parallel sides, which upon lateral deflection of said spring assemblies remain parallel to the other ends of said leaf springs whereby to eliminate torsional strains at the connection of said support member to said vibratory member.

3. The combination of claim 1 wherein each spring assembly comprises a pair of said leaf springs and said support members are rectangular cross-section tubes to opposite sides of which the respective pairs of leaf springs are clamped in such spaced apart relation to eliminate imposing of twisting strains through said support members to said vibratory member whereby the latter may be constructed of relatively thin gauge sheet metal.

References Cited in the file of this patent

UNITED STATES PATENTS

| | | |
|---|---|---|
| 1,146,947 | Norton | July 20, 1915 |
| 1,160,427 | Marcus | Nov. 16, 1915 |

(Other references on following page)

UNITED STATES PATENTS

| | | |
|---|---|---|
| 1,641,435 | Jacobsen | Sept. 6, 1927 |
| 2,085,774 | Symons | July 6, 1937 |
| 2,241,527 | Schieferstein | May 13, 1941 |
| 2,279,742 | Overstrom | Apr. 14, 1942 |
| 2,289,942 | Tafel | July 14, 1942 |
| 2,378,499 | Rapp | June 19, 1945 |
| 2,630,211 | Carrier et al. | Mar. 3, 1953 |

FOREIGN PATENTS

| | | |
|---|---|---|
| 26,606 of 1901 | Great Britain | Dec. 30, 1901 |
| 338,023 | Germany | June 11, 1921 |